United States Patent [19]

Blackburn et al.

[11] Patent Number: 5,036,467
[45] Date of Patent: Jul. 30, 1991

[54] METHOD AND APPARATUS FOR SENSING A VEHICLE CRASH IN REAL TIME USING A FREQUENCY DOMAIN INTEGRATION AND SUMMATION ALGORITHM

[75] Inventors: Brian K. Blackburn; Joseph F. Mazur; Scott B. Gentry, all of Utica, Mich.

[73] Assignee: TRW Vehicle Safety Systems Inc., Lyndhurst, Ohio

[21] Appl. No.: 505,362

[22] Filed: Apr. 4, 1990

[51] Int. Cl.⁵ .................. G06F 7/70; B60R 21/32; B60R 25/10; B60K 28/12
[52] U.S. Cl. .................. 364/424.05; 364/424.01; 364/726; 180/282; 280/735; 340/429
[58] Field of Search ............ 364/424.05, 424.01, 364/424.03, 508, 726, 827; 180/271, 282, 274; 280/728, 734, 735; 307/9.1, 10.1; 340/436, 438, 429

[56] References Cited

U.S. PATENT DOCUMENTS

| | | |
|---|---|---|
| 3,573,446 | 4/1971 | Bergland . |
| 3,762,495 | 10/1973 | Usui et al. . |
| 3,851,162 | 11/1974 | Munoz . |
| 3,870,894 | 3/1975 | Brede et al. . |
| 4,087,782 | 5/1978 | Oishi et al. ............ 280/735 X |
| 4,293,921 | 10/1981 | Smith, Jr. . |
| 4,408,284 | 10/1983 | Kijesky et al. . |
| 4,410,875 | 10/1983 | Spies et al. . |
| 4,497,025 | 1/1985 | Hannoyer . |
| 4,507,705 | 3/1985 | Hoshino et al. . |
| 4,615,027 | 9/1986 | Rajkai et al. . |
| 4,638,179 | 1/1987 | Mattes et al. . |
| 4,684,928 | 8/1987 | Takahashi et al. . |
| 4,777,605 | 10/1988 | Pilkington . |
| 4,805,101 | 2/1989 | Dietrich et al. ............ 364/424.01 |
| 4,805,456 | 2/1989 | Howe et al. . |
| 4,842,301 | 5/1989 | Feldmaier . |
| 4,975,850 | 12/1990 | Diller ............ 364/424.05 |

OTHER PUBLICATIONS

IC Sensor Article, "A Miniature Silicon Accelerometer With Built-In Damping", by Stepehen Terry.
SAE Paper No. 720035, "Comparative Analysis of Crash Sensors", by Jones et al., Jan. 10–14, 1972.
"Correlation . . . A Powerful Technique for Digital Signal Processing", by John Eldon, copyright 1981, TRW Inc.
"TMC 2310 FFT Controller and Arithmetic Unit", TRW LSI Products Inc.
"TMC 2310 Preliminary Information", TRW LSI Products Inc.

Primary Examiner—Parshotam S. Lall
Assistant Examiner—E. J. Pipala
Attorney, Agent, or Firm—Tarolli, Sundheim & Covell

[57] ABSTRACT

A method and apparatus is disclosed for controlling actuation of a passenger restraint system in a vehicle. The apparatus includes an accelerometer for providing a time domain vibratory electric signal having frequency components indicative of a vehicle crash condition. An A/D converter converts the accelerometer signal into a digitized signal. A fast Fourier transform device transforms the digitized time domain vibratory electric signal over at least two time intervals into frequency domain signals. The amplitudes of all the frequency bins over the entire frequency spectrum for each frequency domain signal are summed to provide a value corresponding to the integral of the amplitudes of all the frequency bins over the entire frequency spectrum for the associated frequency domain signal. The integral values of the frequency domain signals are summed. A microcomputer monitors the sum of the integral values of the frequency domain signals and actuates the passenger restraint system when the sum of the integral values of the frequency domain signals is greater than a predetermined threshold thereby indicating a particular type of vehicle crash is occurring.

25 Claims, 9 Drawing Sheets

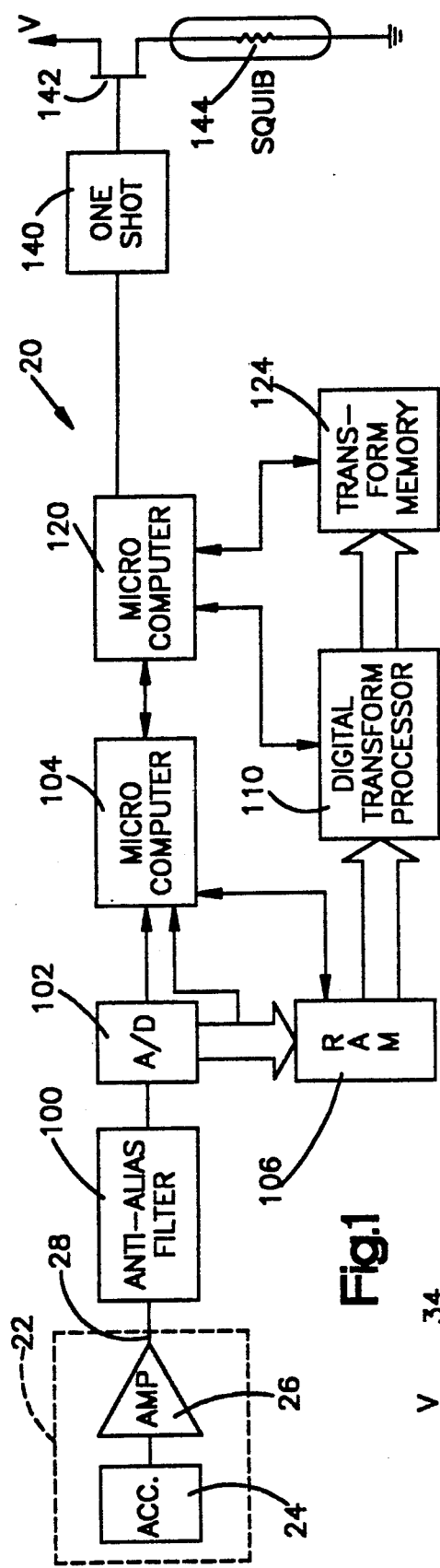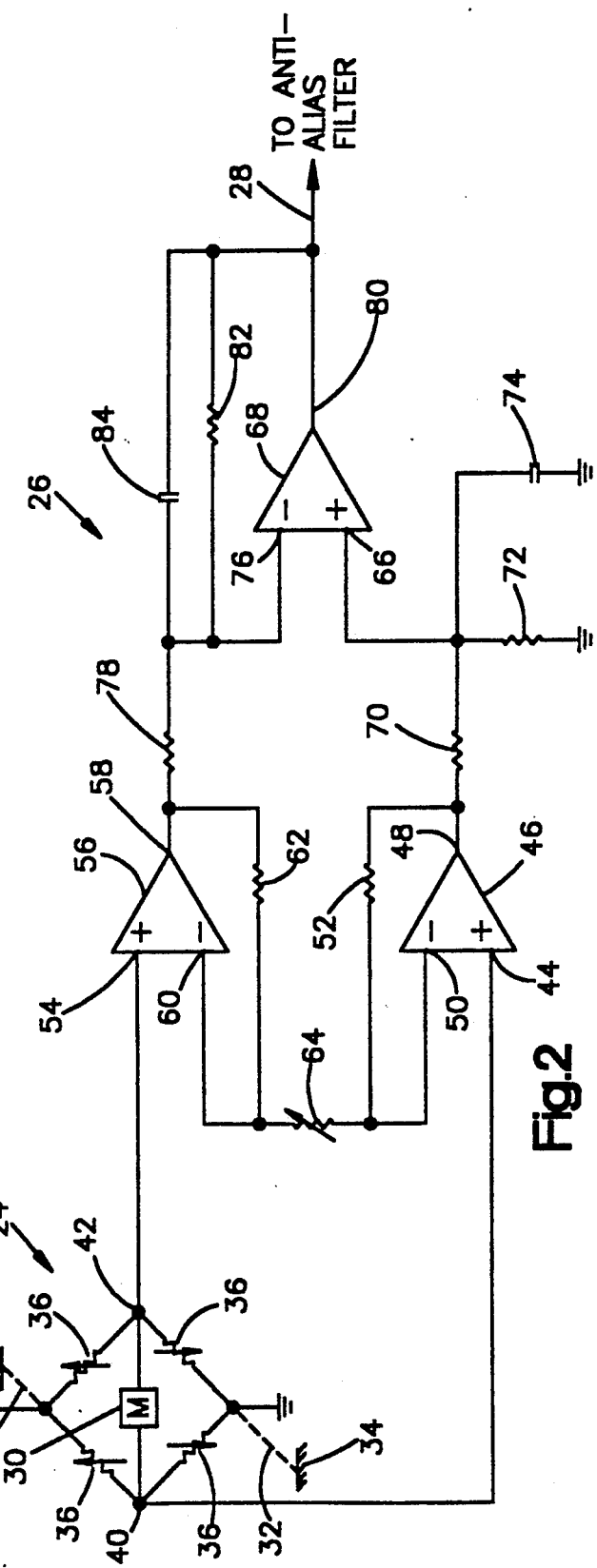
Fig.1
Fig.2

METHOD AND APPARATUS FOR SENSING A VEHICLE CRASH IN REAL TIME USING A FREQUENCY DOMAIN INTEGRATION AND SUMMATION ALGORITHM

TECHNICAL FIELD

The present invention is directed to an actuatable passenger restraint system for a vehicle and is particularly directed to a method and apparatus for sensing a vehicle crash in real time using a frequency domain integration and summation algorithm and for providing an actuation signal upon the frequency domain integration and summation algorithm indicating the occurrence of a predetermined type of crash to actuate a passenger restraint device.

BACKGROUND OF THE INVENTION

Actuatable passenger restraint systems for vehicles are well known in the art. One particular type of actuatable passenger restraint system includes an inflatable air bag mounted within the passenger compartment of the vehicle. The air bag has an associated, electrically actuatable ignitor, referred to as a squib. Such systems further include an inertia sensing device for measuring the deceleration of the vehicle. When the inertia sensing device indicates that the vehicle's deceleration is greater than a predetermined rate, an electric current of sufficient magnitude and duration is passed through the squib to ignite the squib. The squib, when ignited, ignites a combustible gas generating composition or pierces a container of pressurized gas, which results in inflation of the air bag.

Many known inertia sensing devices used in actuatable passenger restraint systems are mechanical in nature. Such devices are typically mounted to the vehicle frame and include a pair of mechanically actuatable switch contacts and a resiliently biased weight. The weight is arranged such that when the vehicle decelerates, the weight physically moves relative to its mounting. The greater the deceleration, the further the weight moves against the bias force. The switch contacts are mounted relative to the biased weight such that, when the weight moves a predetermined distance, the weight moves over or against the switch contacts causing them to close. The switch contacts, when closed, connect a squib to a source of electrical energy sufficient to ignite the squib.

Still other known actuatable passenger restraint systems for vehicles include an electrical transducer or accelerometer for sensing vehicle deceleration. Such systems include a monitoring or evaluation circuit connected to the output of the transducer. The transducer provides an electrical signal having a value indicative of the vehicle's deceleration. The monitoring circuit processes the transducer output signal. One typical processing technique is to directly integrate the transducer output signal by use of an analog integrator. If the output of the integrator exceeds a predetermined value, thereby indicating vehicle deceleration greater than a certain amount, an electrical switch is actuated to connect electrical energy to the squib. One example of such a system is disclosed in U.S. Pat. No. 3,870,894 to Brede, et al., ("the '894 patent").

The '894 patent discloses a system which includes an accelerometer, an evaluation circuit connected to the accelerometer, and an ignition circuit or squib connected to an output of the evaluation circuit. The accelerometer includes a piezoelectric transducer that provides an electrical output signal having a value indicative of the vehicle deceleration. The evaluation circuit includes an integrator electrically coupled to the output of the accelerometer through an amplifier. The output of the integrator is an electrical signal having a value indicative of the integral of the deceleration signal. A trigger circuit is connected to the output of the integrator. When the output of the integrator reaches a predetermined value, the trigger circuit actuates a time delay circuit. The time delay circuit begins to time out a predetermined time period. After the time period is timed out, the air bag ignition circuit is energized.

It has been discovered that it is not desirable to inflate a vehicle air bag under all types of crashes to which the vehicle is subjected. It is not desirable, for example, to inflate the air bag during a low speed, nondeployment crash. A non-deployment crash is one in which it is not desirable to deploy the vehicle air bag. The determination as to what occurrences fall within the definition of a non-deployment crash is dependent upon various factors related to the type of vehicle. If, for example, a large vehicle traveling eight miles per hour hits a parked vehicle, such a crash would be considered a non-deployment crash that would not require deployment of the air bag to protect the vehicle passengers. The vehicle seat belts alone would be sufficient to provide passenger safety in such a crash. During such a nondeployment crash, a typical accelerometer would provide an output signal indicating a rapid deceleration is occurring. In an actuatable passenger restraint system made in accordance with the '894 patent, the air bag would be inflated as soon as the predetermined speed differential occurred and the time delay circuit timed out.

Another type of electronic control arrangement for an actuatable passenger restraint system is disclosed in U.S. Pat. No. 4,842,301 to Feldmaier ("the '301 patent"). The '301 patent discloses an air bag actuation circuit that monitors the acoustic emissions produced during crushing of a vehicle of a type having a welded, unit body structure with a pair of frame side rails extending longitudinally from the front of the vehicle to the back of the vehicle. Two acoustic vibration sensors, in accordance with the '301 patent, are secured as close as possible to the front of respective side rails. The output of each of the sensors is connected to a band pass filter with a frequency range of 200 KHz to 300 KHz so as to exclude lower frequency components. The output of the bandpass filters are connected to envelope detectors. The output of the envelope detectors are connected to comparators. Once the level of the acoustic vibrations in the pass band frequency exceeds a value set by the comparator reference, the air bag is actuated.

SUMMARY OF THE INVENTION

The present invention provides a method and apparatus for electrically-controlling an actuatable passenger restraint system which actuates the system only upon a frequency domain integration and summation algorithm indicating the occurrence of a predetermined type of crash, i.o., one that requires the use of the system for protection of the vehicle passengers.

In accordance with one aspect of the present invention, an apparatus is provided for controlling actuation of a passenger restraint system in a vehicle. The apparatus comprises sensing means for providing a time domain vibratory electric signal having frequency components indicative of a vehicle crash condition. The apparatus also includes means for transforming the time domain vibratory electric signal over at least two time intervals into associated frequency domain signals, means for integrating each of the frequency domain signals, and means for summing the integrals of the frequency domain signals. The apparatus further includes means for actuating the passenger restraint system when the sum of the integrals of the frequency domain signals indicates a predetermined type of vehicle crash is occurring.

In accordance with another aspect of the present invention, a method is provided for controlling actuation of a passenger restraint system in a vehicle. The method includes the steps of providing a time domain vibratory electric signal having frequency components indicative of a vehicle crash condition, transforming the time domain vibratory electric signal over at least two time intervals into associated frequency domain signals, integrating each of the frequency domain signals, summing the integrals of the frequency domain signals, and actuating the passenger restraint system when the sum of the integrals of the frequency domain signals indicates a predetermined type of vehicle crash is occurring.

BRIEF DESCRIPTION OF THE DRAWINGS

Other features and advantages of the present invention will become apparent to those skilled in the art to which the present invention relates from a reading of the following detailed description of preferred embodiments with reference to the accompanying drawings, in which:

FIG. 1 is a schematic block diagram showing a passenger restraint control system made in accordance with the present invention;

FIG. 2 is a schematic diagram of the accelerometer assembly shown in FIG. 1;

DESCRIPTION OF PREFERRED EMBODIMENTS

Figure 3:
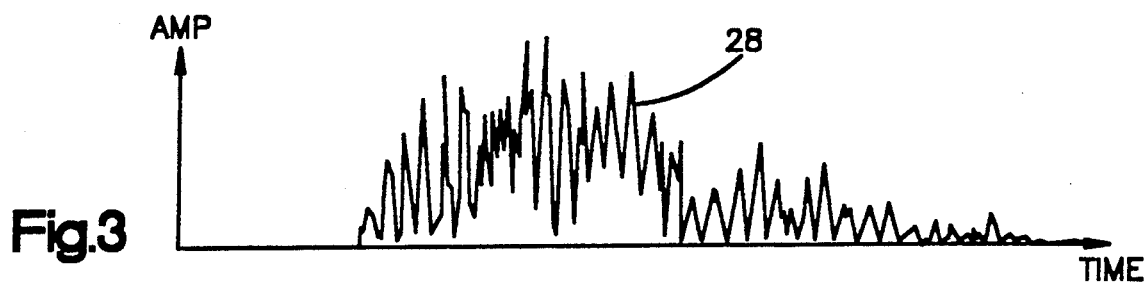
FIG. 3 is a graphical representation of the output of the accelerometer assembly during a non-deployment vehicle crash condition.

Referring to FIG. 1, an apparatus 20 is shown for controlling the actuation of an air bag restraint system in accordance with the present invention. An accelerometer assembly 22 includes an accelerometer or vibratory transducer 24 electrically connected to an amplifier 26. The output 28 of the amplifier 26 is an oscillating signal having frequency components. It has been discovered that for each of various types of vehicle crash conditions, the accelerometer output has particular, identifiable frequency components present.

Referring to FIG. 2, the accelerometer assembly 22 includes a mass 30 suspended by a cantilever support arrangement 32 secured to a housing 34. The housing is securable to the vehicle. Four variable resistors 36 are mounted to the cantilever support arrangement. The resistors 36 are electrically connected in a Wheatstone bridge configuration between electrical ground and a source of electrical energy V.

When the mass 30 of the accelerometer moves relative to its housing 34, as happens during a vehicle crash, the resistance values of the resistors 36 change. Because of the Wheatstone bridge configuration, a voltage variation occurs across terminals 40, 42 which is indicative of the movement of the mass 30. Such a transducer or accelerometer is available commercially from ICSensors, 1701 McCarthy Blvd., Milpitas, Calif. 95035 under Model No. 3021.

The bridge resistors 36 are connected to amplifier 26 which provides the output signal 28 having a value indicative of the movement of the mass 30. Specifically, terminal 40 is connected to a non-inverting input 44 of an operational amplifier ("op amp") 46. The output 48 of op amp 46 is connected to its inverting input 50 through feedback resistor 52. Terminal 42 is connected to a noninverting input 54 of an op amp 56. The output 58 of the op amp 56 is connected to its inverting input 60 through a feedback resistor 62. The inverting input 50 of op amp 46 and the inverting input 60 of op amp 56 are connected together through a variable resistor 64.

The output 48 of the op amp 46 is also connected to the non-inverting input 66 of op amp 68 through a resistor dividing network including resistors 70, 72. A filter capacitor 74 is connected between the junction of resistors 70, 72 and electrical ground. The output 58 of op amp 56 is also connected to the inverting input 76 of op amp 68 through a resistor 78. The output 80 of op amp 68 is connected to the inverting input 76 of the op amp 68 through parallel connected resistor 82 and capacitor 84.

If each of the resistors 52, 62, 70, 72, 78, and 82 has the same resistance value, designated R, and if the resistance value of the variable resistor 64 is designated Rvar, the gain "G" of the amplifier 26 is given by:

$$G = (1 + (2R/Rvar))$$

A deployment crash is one in which it is desirable to deploy the air bag. A non-deployment crash is one in which it is not desirable to deploy the air bag. The word "deployment" is also meant to include outputting of an electrical control signal in a lockable seat belt system so as to lock the seat belt. It has been discovered that if an identical type or class of vehicle is subjected to both deployment and non-deployment crashes, different frequency components are present in the output of the accelerometer. Also, different types of vehicles subjected to the same type of crash may exhibit different frequency components in the accelerometer output signal. For example, if a particular make or model of a vehicle is crashed into a pole at 30 MPH, certain frequency components are present in the accelerometer output signal. If a different make and model vehicle is also crashed into a pole at 30 MPH, completely different frequency components may be present in the accelerometer output signal even though the accelerometers are mounted in equivalent areas in both of the two different types of vehicles. For purposes of describing a preferred embodiment of the invention, frequency components exhibited by one make and model of vehicle ar discussed for different types of vehicle crashes.

Figure 4:
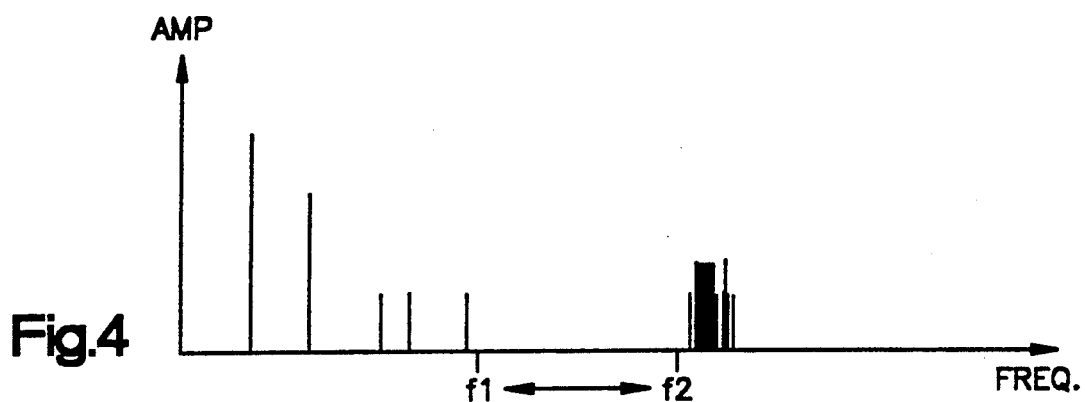
FIG. 4 is a graphical representation of the Fourier transform of the output signal shown in FIG. 3.

Referring to FIG. 3, the output 28 of the accelerometer assembly 22 is graphically depicted during a non-deployment crash condition with amplitude on the y-axis and time on the x-axis. The rough appearance to the graph of the output signal 28 is due to the vibrations of the mass 30 during the vehicle crash. FIG. 4 graphically depicts the Fourier transform of the accelerometer signal depicted in FIG. 3. Amplitude is on the y-axis and frequency is on the x-axis.

Figure 5:
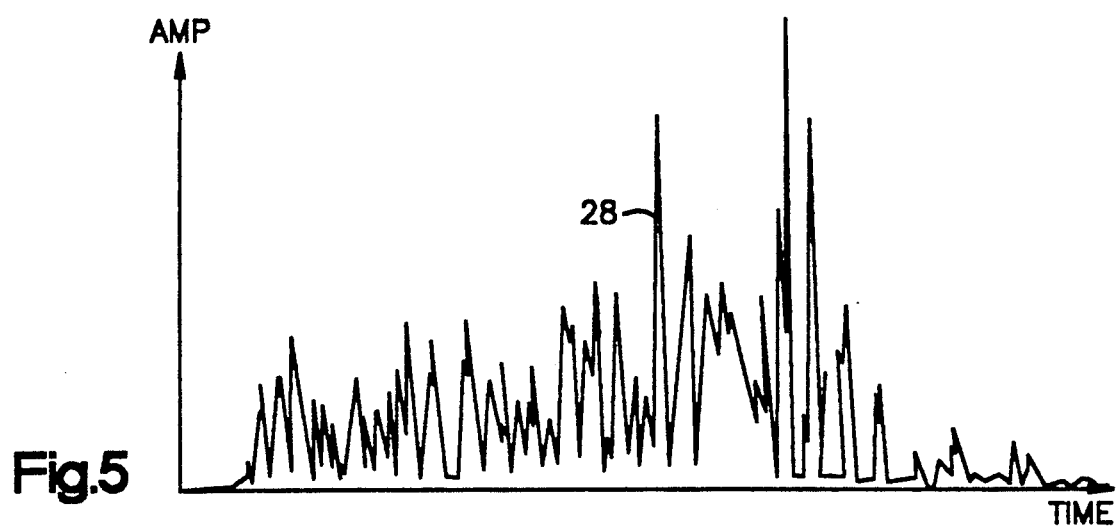
FIG. 5 is a graphical representation of the output of the accelerometer assembly when the vehicle is subjected to a deployment crash condition.
Figure 6:
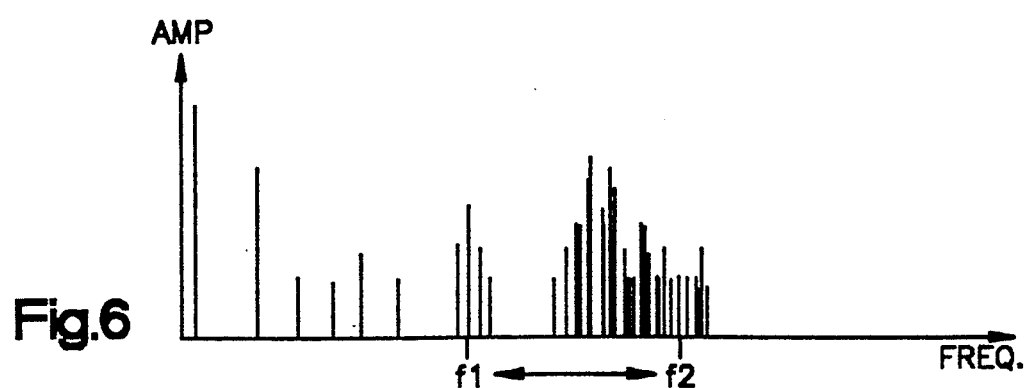
FIG. 6 is a graphical representation of the Fourier transform of the output signal shown in FIG. 5.

Referring to FIG. 5, the output 28 of the accelerometer assembly 22 is graphically depicted during a deployment crash condition with amplitude on the y-axis and time on the x-axis. The rough appearance to the graph of the output signal 28 is due to the vibrations of the mass 30 during the vehicle crash. FIG. 6 graphically depicts the Fourier transform of the accelerometer signal depicted in FIG. 5. Amplitude is on the y-axis and frequency is on the x-axis.

Comparing the graphs of FIG. 4 and FIG. 6, one can see differences between the frequency components that are present during a non-deployment vehicle crash condition (FIG. 4) and the frequency components that are present during a deployment vehicle crash condition (FIG. 6). In FIG. 4, there are no frequency components of significant magnitude present between frequency f1 and frequency f2. In contrast, frequency components of significant magnitude are present in the frequency band f1 to f2 shown in FIG. 6. Therefore, if one were to monitor the frequency band f1 to f2 over time, and if one were to observe that a change occurred from no significant frequency components being present to significant components being present, such a change would be an indication that a vehicle crash was occurring for which the air bag should be deployed.

Referring to FIG. 1, the output 28 of the accelerometer assembly 22 is connected to an anti-alias filter 100 which filters out high frequency components from the signal 28. It is contemplated that the frequencies of concern from the output of the accelerometer assembly 22, i.e., those indicative of a particular type of vehicle crash condition, will be less than 3 KHz.

The output of the anti-alias filter 100 is connected to an analog-to-digital ("A/D") converter 102 of a type well known in the art. The A/D converter 102 is connected to a first microcomputer 104 which controls the A/D converter. The control of an A/D converter by a microcomputer is well known in the art and is, therefore, not described herein in detail. Also, microcomputers are referred to in the art as microcontrollers and are commercially available from several manufactures in single chip package. Anti-alias filtering prior to feeding a signal to an A/D converter is also known in the art of digital filtering. Such filters are used to eliminate out-of-band signals that can be aliased back into the desired frequency band because of a particular chosen sampling rate.

The output of the A/D converter 102 is connected to a random access memory ("RAM") 106. The microcomputer 104 is also connected t the RAM 106 and controls the locations within the RAM 106 where the data from the A/D converter is stored. This is accomplished by the microcomputer addressing locations of the RAM 106 as the data is output from the A/D converter 102.

In a preferred embodiment of the present invention, the RAM 106 is divided into four groups of 128 data sets. Each data set is indicative of the analog value of the accelerometer assembly signal 28 present at its associated sampled time. The output of the RAM 106 is connected to a digital transform processor 110. The digital transform processor 110 provides an output signal that represents the transform of the time domain output signal of the accelerometer assembly 22 into a frequency domain signal.

It is contemplated that the digital transform processor 110 can take one of several forms such as a fast Fourier transform device, a cosine transform device, etc. One contemplated digital transform processor that can be used in the present invention is a fast Fourier transformer that is manufactured by TRW LSI Products Inc., of La Jolla, CA under part No. TMC2310. Fast Fourier transformers are typically available in 128 data points or 1024 data points. For purposes of explanation only, it is assumed that the digital transform processor 110 is a 128 data points fast Fourier transform processor that provides a signal indicative of the amplitude of frequency components present over a predefined frequency spectrum. The frequency spectrum is divided into 128 frequency bins. Each amplitude value at each of the 128 fast Fourier transform data points or frequency bins is eight bits wide.

The digital transform processor 110 is connected to a second microcomputer 120 that controls the processor 110. The second microcomputer 120 is also connected to the first microcomputer 104. The output of the digital transform processor 110 is connected to a transform memory 124. The memory 124 is connected to and controlled by the second microcomputer 120. After the digital transform processor 110 completes a transform, the resultant transform over the monitored frequency spectrum is stored in an addressable location within the memory 124.

Figure 7:
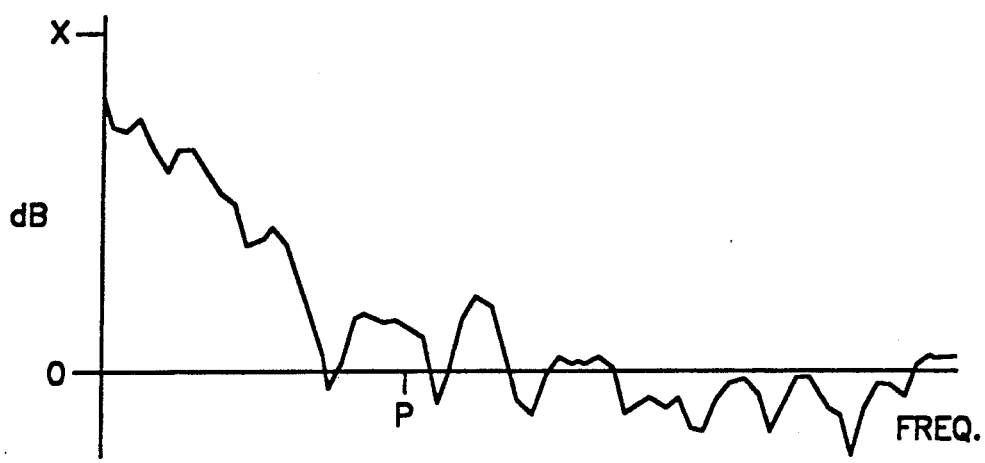
FIG. 7 is a graphical representation of a first Fourier transform of the output signal from the accelerometer assembly output shown in FIG. 2 during a 14 mph barrier crash for a particular type of vehicle over a predetermined frequency spectrum.
Figure 8:
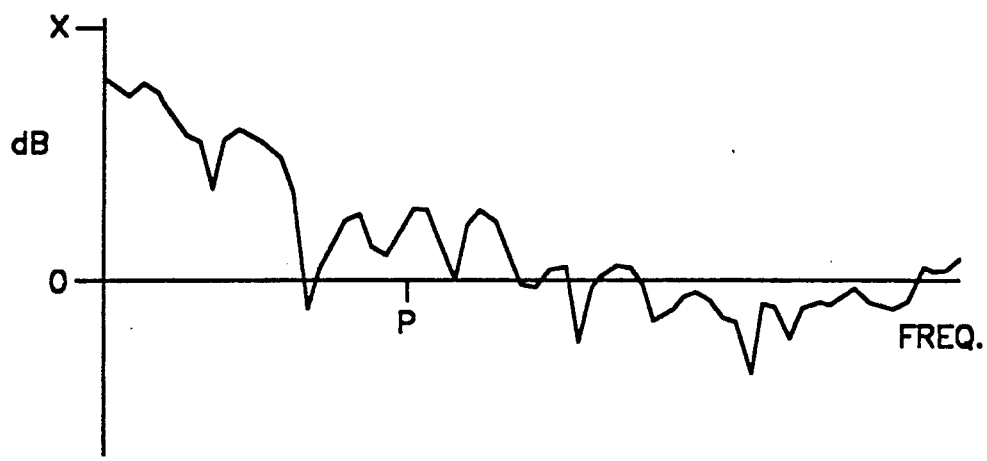
FIG. 8 is a graphical representation of a second Fourier transform of the output signal from the accelerometer assembly output shown in FIG. 2 during a 14 mph barrier crash for the particular type of vehicle over the predetermined frequency spectrum.
Figure 9:
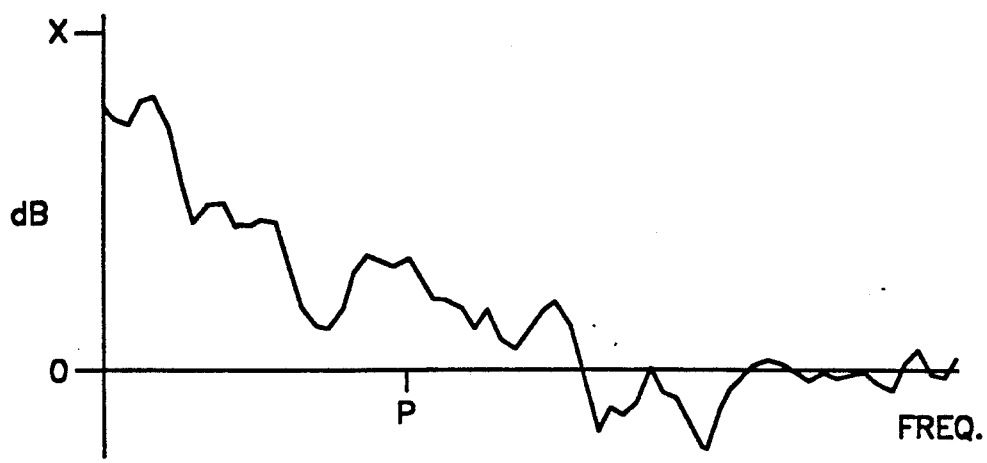
FIG. 9 is a graphical representation of a third Fourier transform of the output signal from the accelerometer assembly output shown in FIG. 2 during a 14 mph barrier crash for the particular type of vehicle over the predetermined frequency spectrum.
Figure 10:
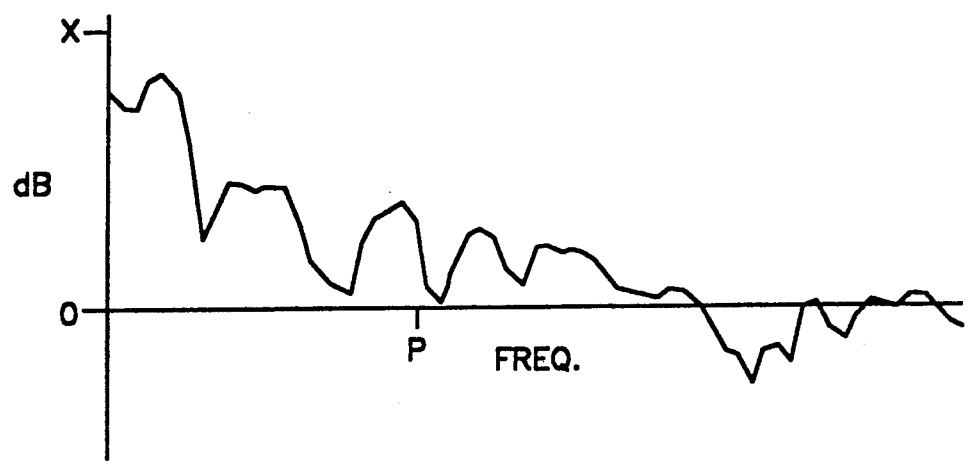
FIG. 10 is a graphical representation of a fourth Fourier transform of the output signal from the accelerometer assembly output shown in FIG. 2 during a 14 mph barrier crash for the particular type of vehicle over the predetermined frequency spectrum.

Preferably, the memory 124 is an addressable memory divided into four groups of 128 data sets. Each data set is addressable and includes eight bits of information to form one word. FIG. 7 graphically depicts a first Fourier transform of the accelerometer signal over a first time interval during a deployment crash condition such as a 14 mph barrier crash. FIG. 8 graphically depicts a second Fourier transform of the accelerometer signal over a second time interval. FIG. 9 graphically depicts a third Fourier transform of the accelerometer signal over a third time interval. FIG. 10 graphically depicts a fourth Fourier transform of the accelerometer signal over a fourth time interval. In each of the FIGS. 7-10, the y-axis is in decibels ("dB") and the x-axis is in frequency.

The four time intervals are the same duration. The first, second, third, and fourth time intervals are staggered by a predetermined time delay. The predetermined time delay is selected to have a duration which is one-fourth of the duration of time interval required to obtain 128 A/D conversions stored in memory 106. For example, the first Fourier transform is associated with data points 1-128 stored in RAM 106. The second transform is then delayed by a time necessary to do 32 new A/D conversions so that the second fast Fourier transform is associated with data points 33-160.

Each of the four groups of 128 data sets of the memory 124 is used to store one of the four Fourier transforms shown in FIGS. 7-10. Each of the 128 data sets of the memory 124 is indicative of the amplitude of the associated frequency component contained within a particular frequency bin of the associated Fourier transform of the accelerometer signal 28. A first group of 128 data sets of the memory 124 stores information representative of the first Fourier transform of the accelerometer signal 28. A second group of 128 data sets of the memory 124 stores information representative of the second Fourier transform of the accelerometer signal 28. A third group of 128 data sets of the memory 124 stores information representative of the third Fourier transform of the accelerometer signal 28. A fourth group of 128 data sets of the memory 124 stores information representative of the fourth Fourier transform of the accelerometer signal 28.

The second microcomputer 120 processes the Fourier transform information stored in the four groups of 128 data sets of the memory 124 in accordance with a programmed routine stored in an internal memory of the microcomputer 120. The microcomputer 120 takes the Fourier transform stored in each of the four groups of 128 data sets of the memory 124 and sums the amplitudes of all the frequency bins over the entire frequency spectrum for that particular one of the four groups of 128 data sets of memory 124. The sum of the amplitudes of each group of 128 data sets of the memory 112 is stored in an associated memory register internal to the microcomputer 120. The sum of the amplitudes of each group of 128 data sets of the memory 124 corresponds to the integral of the amplitudes of all the frequency bins over the entire frequency spectrum for that particular group of 128 data sets of the memory 124. An integral is performed by the microcomputer 120 by doing a series of discrete summations. Thus, there are four integral values, each integral value corresponding to the sum of the amplitudes of an associated one of the four groups of 128 data sets of the memory 124. After the microcomputer 120 determines the integral value of each of the four groups of 128 data sets, the microcomputer 120 then sums the results of the four integral values together. The sum of the four integral values is stored in another memory register internal to the microcomputer 120 for further data processing.

Figure 11:
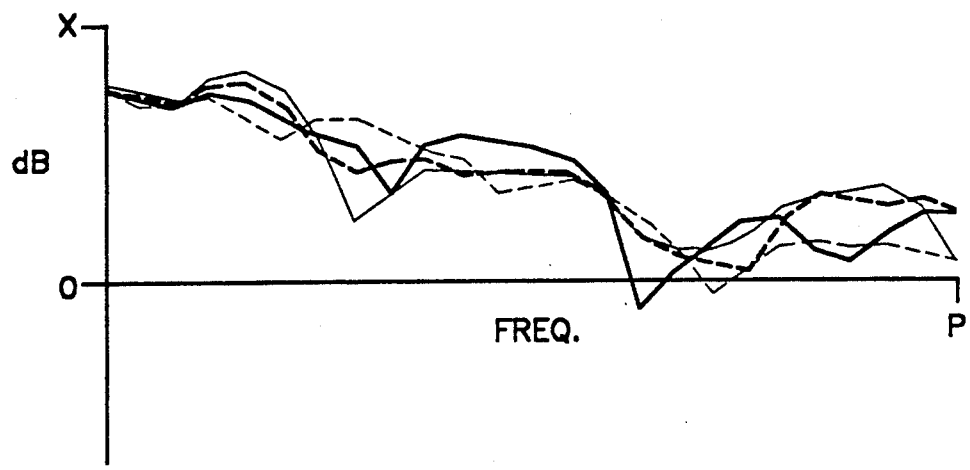
FIG. 11 is a graphical representation of a portion of each of the graph lines shown in FIGS. 7 to 10 over a portion of the predetermined frequency spectrum.

FIG. 11 graphically depicts a portion of each of the graph lines shown in FIGS. 7-10 over a predetermined frequency spectrum for a particular type of vehicle crash. Amplitude is on the y-axis in decibels ("dB") and frequency is on the x-axis. More specifically, only a first portion (designated between zero and the letter "P" in each of FIGS. 7-11) of the 128 frequency bins of FIGS. 7-10 is shown in FIG. 11. The type of vehicle crash condition is defined in terms of the speed of the vehicle, the travelling direction of the vehicle, and the type of object hit by the vehicle. By way of example, the vehicle crash depicted in FIGS. 7-11 is a 14 miles per hour straight ahead barrier crash.

The microcomputer 120 is connected to a one-shot 140. When the microcomputer 120 determines that the vehicle is in a deployment crash condition, a trigger signal is output to the one-shot 140. The output of the one-shot 140 is connected to an electronic, normally open switch 142, such as a field effect transistor ("FET"). The switch 142 is connected in series with a squib 144 between a source of electrical energy V and electrical ground. Upon being triggered, the one-shot outputs a pulse that closes the switch 142 for a time duration sufficient to insure that the squib is ignited.

Figure 12:
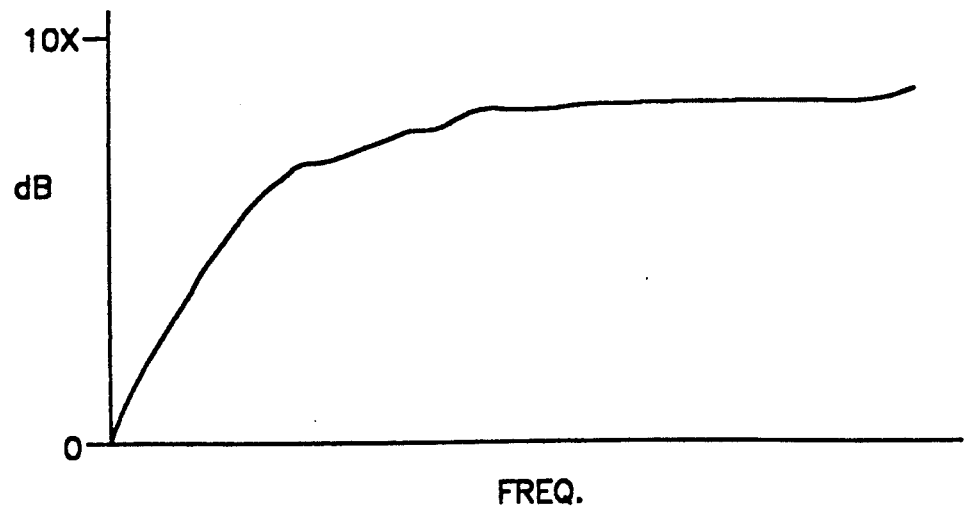
FIG. 12 is a graphical representation of the integral of the frequency components over the predetermined frequency spectrum of the first Fourier transform shown in FIG. 7.
Figure 13:
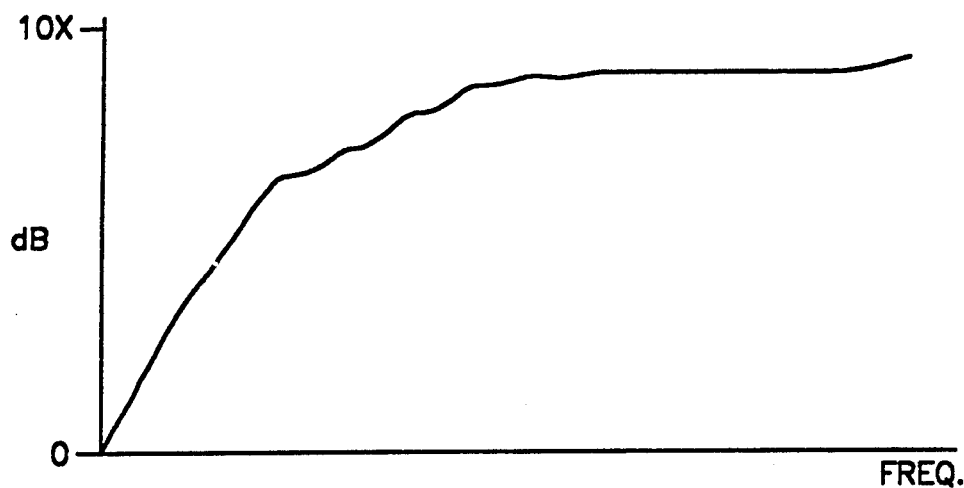
FIG. 13 is a graphical representation of the integral of the frequency components over the predetermined frequency spectrum of the second Fourier transform shown in FIG. 8.
Figure 14:
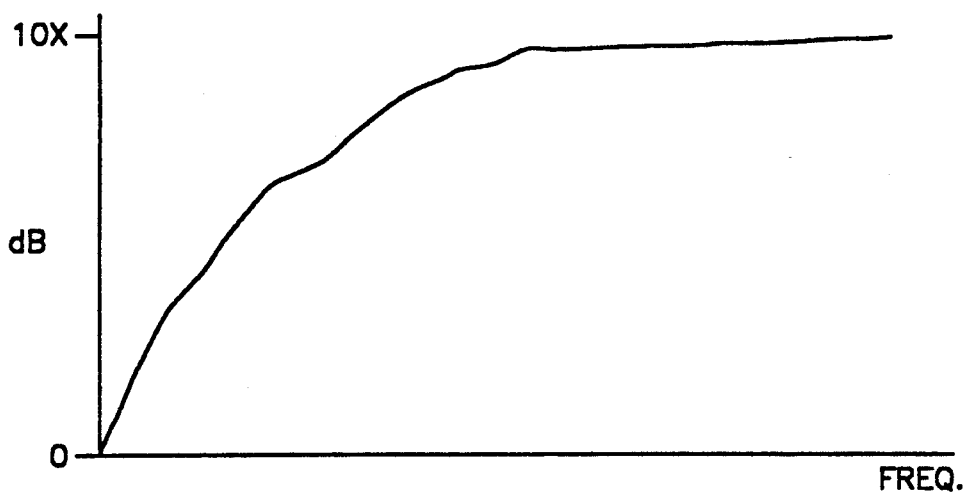
FIG. 14 is a graphical representation of the integral of the frequency components over the predetermined frequency spectrum of the third Fourier transform shown in FIG. 9.
Figure 15:
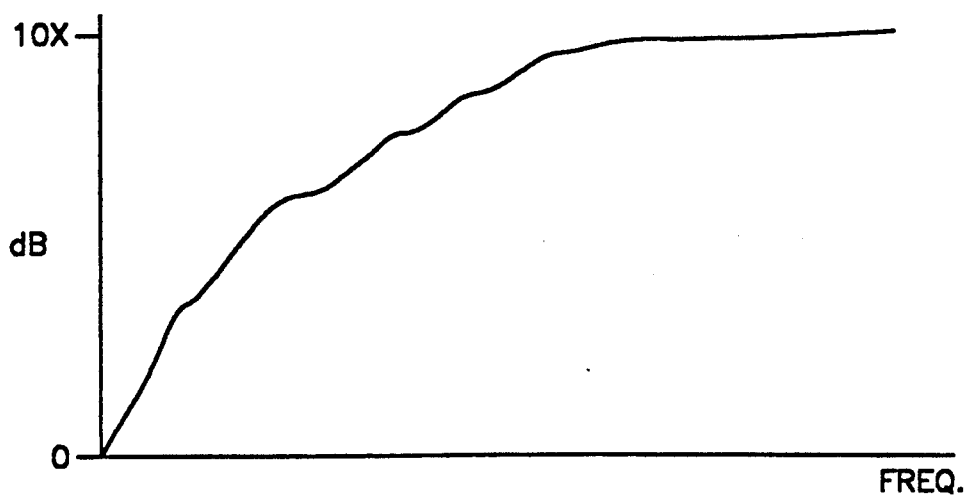
FIG. 15 is a graphical representation of the integral of the frequency components over the predetermined frequency spectrum of the fourth Fourier transform shown in FIG. 10.

FIG. 12 graphically depicts the sums of the amplitudes of all the frequency bins over the entire frequency spectrum of the first Fourier transform shown in FIG. 7. This sum of the amplitudes of the first Fourier transform corresponds to the integral of the amplitudes of all the frequency bins over the entire frequency spectrum of the first Fourier transform. FIG. 13 graphically depicts the sum of the amplitudes of all the frequency bins over the entire frequency spectrum of the second Fourier transform shown in FIG. 8. This sum of the amplitudes of the second Fourier transform corresponds to the integral of the amplitudes of all the frequency bins over the entire frequency spectrum of the second Fourier transform. FIG. 14 graphically depicts the sum of the amplitudes of all the frequency bins over the entire frequency spectrum of the third Fourier transform shown in FIG. 9. This sum of the amplitudes of the third Fourier transform corresponds to the integral of the amplitudes of all the frequency bins over the entire frequency spectrum of the third Fourier transform. FIG. 15 graphically depicts the sum of the amplitudes of all the frequency bins on the entire frequency spectrum of the fourth Fourier transform shown in FIG. 10. This sum of the amplitudes of the fourth Fourier transform corresponds to the integral of the amplitudes of all the frequency bins over the entire frequency spectrum of the fourth Fourier transform. In FIGS. 12-15, the Y-axis is in decibels ("dB") and the X-axis is in frequency.

Figure 16:
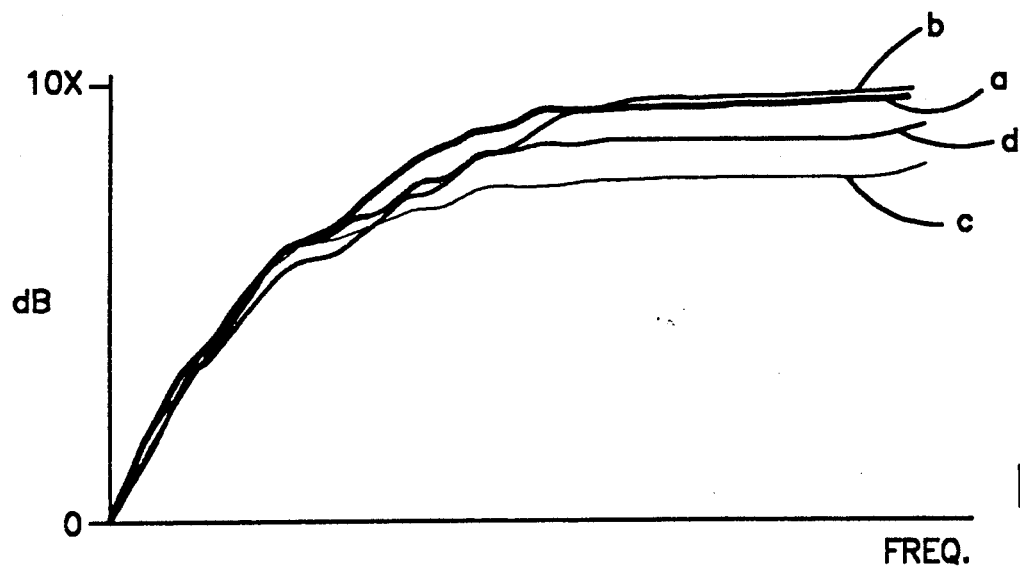
FIG. 16 is a composite graphical representation of the graph lines shown in each of FIGS. 12 to 15.

FIG. 16 shows four graph lines designated a-d and is a composite graphical representation of the graph lines shown in FIGS. 12 to 15. Amplitude is on the Y-axis in decibels ("dB") and frequency is on the X-axis. Graph line a corresponds to the graph line shown in FIG. 12, graph line b corresponds to the graph line shown in FIG. 13, graph line c corresponds to the graph line shown in FIG. 14, and graph line d corresponds to the graph line shown in FIG. 15. As already mentioned, each of the graph lines shown in FIG. 16 represents the integral of the amplitudes of all the frequency bins over the entire frequency spectrum of its associated Fourier transform. The result of the four integrals represented in FIG. 16 are summed together to provide a sum of the four integrals.

Figure 17:
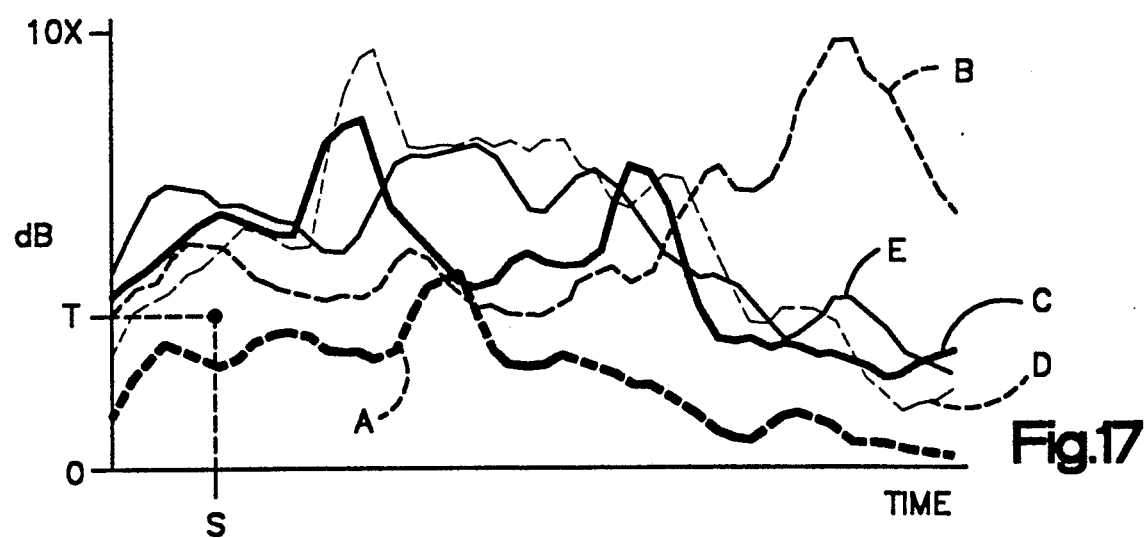
FIG. 17 is a graphical representation showing over time the sums of integrals of Fourier transforms for five different types of vehicle crash conditions.

FIG. 17 shows five graph lines designated A-E where each graph line represents a different type of vehicle crash. Amplitude is on the y-axis in dB and time is on the x-axis. Each point on each of the five graph lines depicted in FIG. 17 represents the sum of the four integrals of their Fourier transforms at that associated point in time. The value of the sum of the four integrals is dependent on the particular type of crash condition in which the vehicle is in. Graph line A is associated with an 8 mph barrier vehicle crash. Graph line B is associated with a 14 mph barrier vehicle crash. Graph line C is associated with an 18 mph pole vehicle crash. Graph line D is associated with a vehicle crash occurring at 31 mph into a barrier at 30 degrees. Graph line E is associated with a vehicle crash occurring at 31 mph into a barrier. Graph line B in FIG. 17 is associated with the graph lines represented in FIG. 16 in that the resultant sum of the four integrals of FIG. 16 corresponds to one particular point in time on the graph line of FIG. 17.

Each of the five graph lines shown in FIG. 17 is obtained through empirical methods of repeatedly subjecting the particular type of vehicle to associated types of crash conditions. For example, in the case of graph line B, the crash condition is a 14 mph straight ahead barrier crash. The other graph lines shown in FIG. 17 are obtained through empirical methods of repeatedly subjecting the particular type of vehicle to the associated other types of crash conditions.

Each of the five graph lines shown in FIG. 17 represents the amplitude of the sum of four associated integrals over time. Although the five graph lines are shown continuous in FIG. 17, each line actually includes a series of individual points connected with each other to form the particular graph line. Each point of a graph line represents the sum of four associated integrals of Fourier transforms at an associated point in time. The empirically determined sums of four associated integrals over time are used in the control process of the microcomputer 120 to make a determination as to whether to actuate the passenger restraint system.

In accordance with one embodiment of the present invention, a plurality of empirically determined threshold values are stored in the internal memory of the microcomputer 120. Each threshold value corresponds to a no-fire barrier crash condition, i.e., a crash which does not require deployment of an airbag for protection of the vehicle passengers. Such a no-fire barrier crash condition is typically in the range of 7 to 10 miles per hour. The sum of four associated integrals of at least one preselected time is compared to an associated threshold value stored in the internal memory of the microcomputer 120 for the preselected time to determine if a deployment vehicle crash condition has occurred.

If the sum of four associated integrals at non of the preselected times exceeds an associated predetermined threshold value, then such is indicative that no deployment crash has occurred. If the microcomputer 120 determines that no deployment crash has occurred, the first group of 128 data sets of the memory 124 is shifted out and is written over by a new group of 128 data sets. If the microcomputer 120 determines that no deployment crash has occurred in the next program cycle, the second group is shifted out and is written over by a new group of 128 data sets. Similarly, in the next program cycle, if the microcomputer 120 determines that no vehicle deployment crash has occurred, the third group is shifted out and is written over. Similarly, in the next cycle, the fourth group is shifted out and is written over. This shifting out and writing over process then starts again with the first group of 128 data sets of the memory 124. The shifting out and writing over process allows the microcomputer 120 to monitor the vehicle continuously for a vehicle crash condition. If the sum of four associated integrals of at least one preselected time exceeds its associated predetermined threshold value, then such is indicative, of a vehicle crash condition that requires deployment of an air bag.

The threshold values depend upon the particular type of vehicle. Each threshold value is selected based upon empirical crash data obtained for the particular type of vehicle. By way of example with reference to FIG. 17, the threshold value at a preselected time S is selected at a dB value T above which deployment of an airbag is desired and below which deployment is not desired. The predetermined threshold value T at the preselected time S is selected so that a relatively wide separation is present between one graph line corresponding to a vehicle crash condition in which deployment of the airbag is definitely desired and another graph line corresponding to a vehicle crash condition in which deployment is definitely not desired.

In accordance with another embodiment of the present invention, a plurality of predetermined summation threshold values are stored in the internal memory of the microcomputer 120. After the microcomputer 122 determines that at least one of the predetermined threshold values has been exceeded at an associated preselected time, the microcomputer 120 determines the severity of the crash by comparing the sum of the four associated integrals at the preselected time to an associated predetermined summation threshold value stored in the internal memory of the microcomputer 120 corresponding to the preselected time.

Each of the predetermined summation threshold values, which correspond to a particular type of crash condition, depends upon the make and model of the vehicle. By way of example, four predetermined summation threshold values for a preselected time are stored in the internal memory of the microcomputer 120 for the purpose of determining the severity of the crash. A first summation threshold value corresponds to a no-fire barrier crash, a second summation threshold value corresponds to a long velocity change crash, a third summation threshold value corresponds to an all-fire barrier crash, and a fourth summation threshold value corresponds to a high speed barrier crash. A nofire barrier crash is equivalent to a 7 to 10 miles per hour barrier crash. A long velocity change crash is equivalent to a 12 to 21 miles per hour pole crash, and an all-fire barrier crash is equivalent to a 12 to 16 miles per hour barrier crash. A high speed barrier crash is equivalent to a 30 miles per hour barrier crash.

Figure 18:
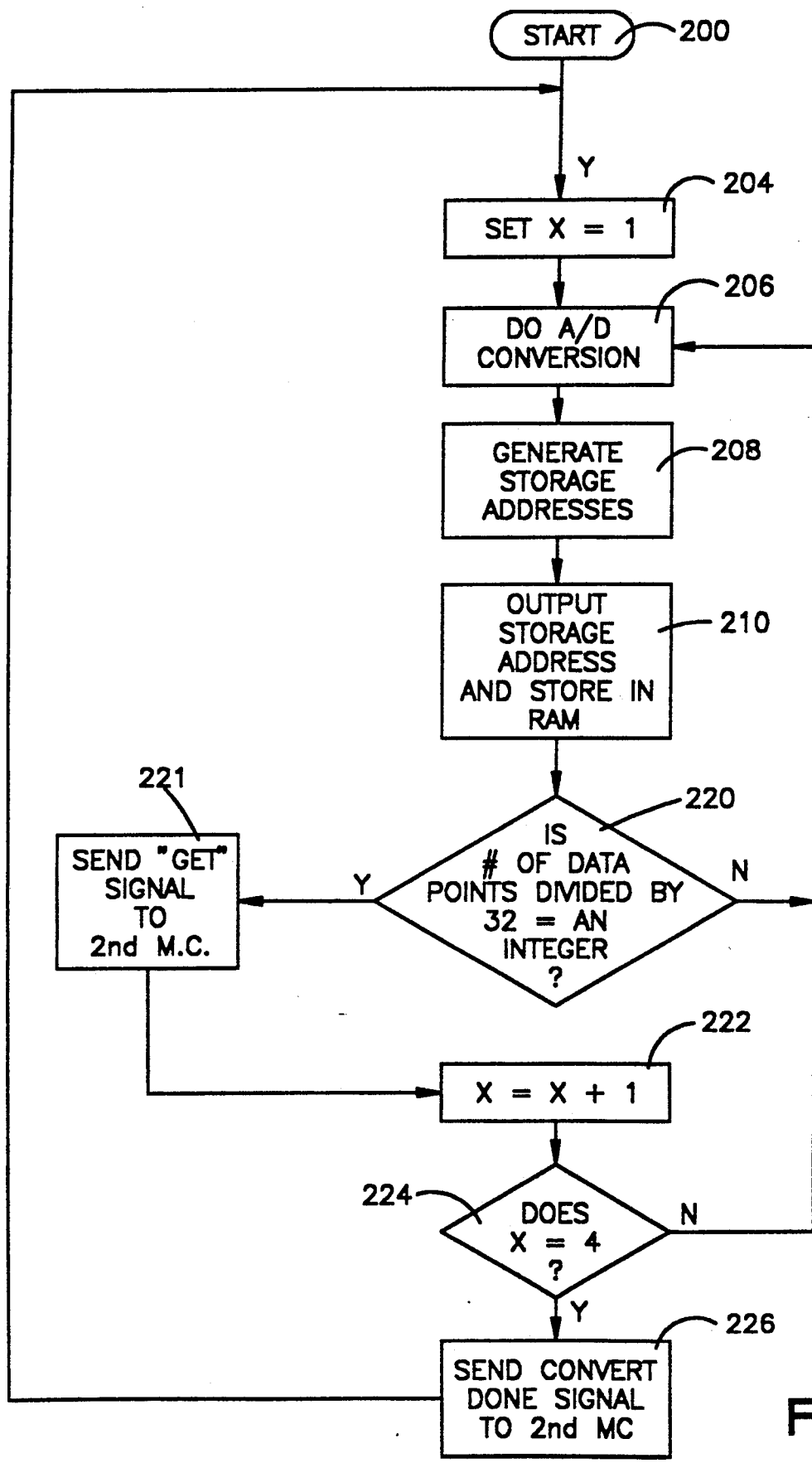
FIG. 18 is a flow chart depicting the control process for one microcomputer shown in FIG. 1.

Referring to FIG. 18, the data conversion control of the A/D converter will be better understood. The control starts at step 200. In step 204, the microcomputer 104 sets a value X equal to one. In step 206, the microcomputer 104 enables the A/D converter to begin conversion. The microcomputer 104 then generates addressable storage locations for the RAM 106 in step 208. In step 210, the converted signals from the A/D converter 102 are stored in RAM 106. As mentioned above, the converted values are stored in four groups with 128 sets of data points in each group.

In step 220, a determination is made as to whether or not the number of data point sets converted and stored divided by 32 is equal to an integer. Since the total data sets per group is 128, dividing by 32 will give a 75% overlap for data analysis. If the determination is negative, the control loops back to step 206 where further conversions are done. If the determination in step 220 is affirmative, the control proceeds to step 221 where the first microcomputer 104 sends a "get" signal to the second microcomputer 120. The program then proceeds to step 222 where X is set equal to X + 1. In step 224, the microcomputer 104 makes a determination as to whether the value of X is equal to 4. If the determination in step 224 is negative, the control arrangement proceeds back to step 206. If the determination in step 224 is affirmative, the control arrangement proceeds to step 226. In step 226, the microcomputer 104 sends a "convert done" signal to the second microcomputer 120.

Figure 19:
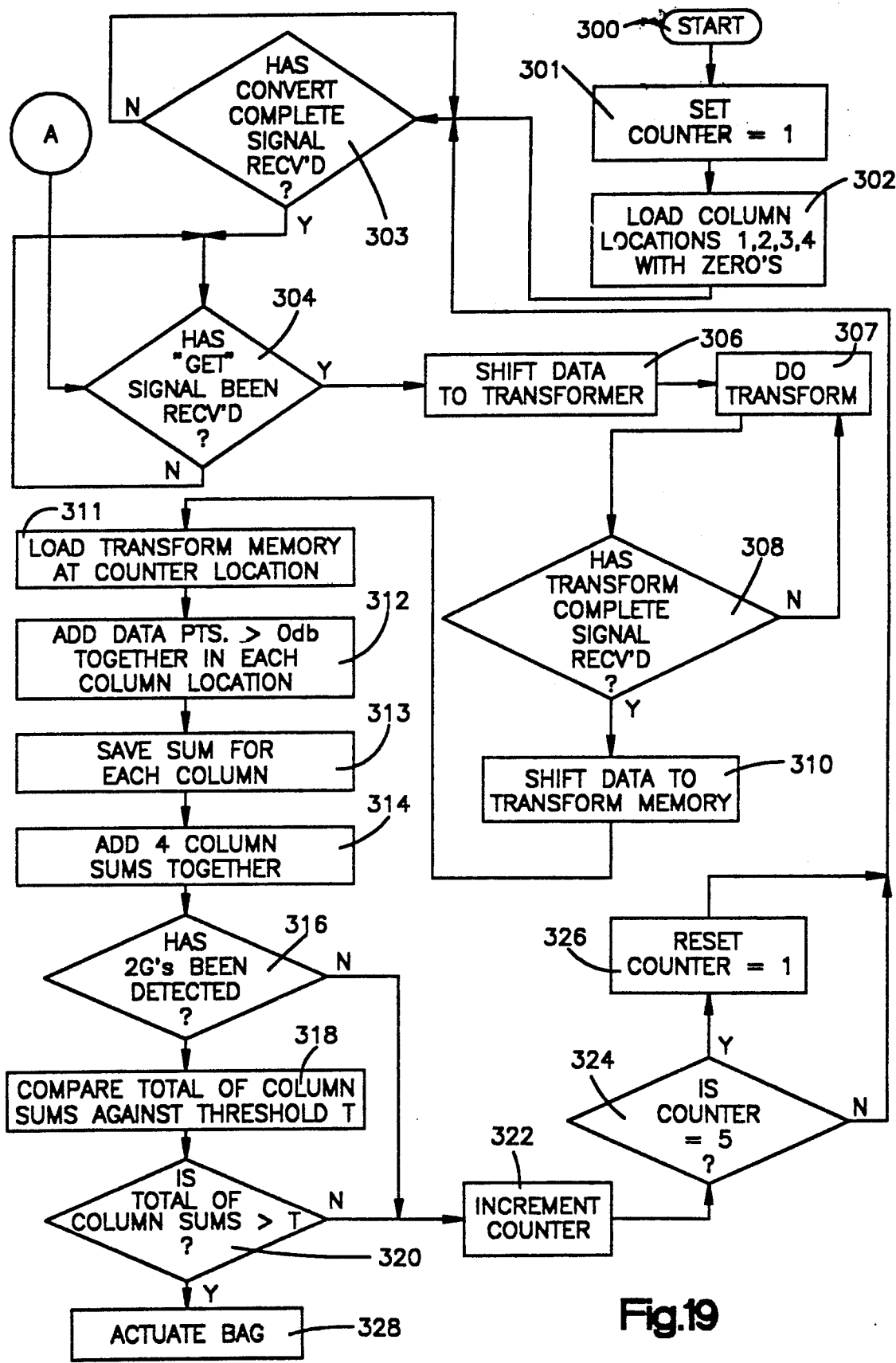
FIG. 19 is a flow chart depicting the control process for the other microcomputer shown in FIG. 1.

FIG. 19 shows the control procedure followed by the second microcomputer 120, in accordance with the present invention, for transforming the A/D converter data into the frequency domain. The procedure starts in step 300. In step 301, a counter is set to a value of one. In step 302, each data set in the four groups of 128 data sets of the transform memory 124 is initially set to a value of zero. A determination is made in step 303 as to whether the convert complete or done signal has been received from the A/D converter. If the determination is negative, the control procedure loops back upon itself. If the determination in step 303 is affirmative, which indicates that 128 data points are ready for transformation into the frequency domain, the program proceeds to step 304 in which a determination is made as to whether the "get" signal has been received.

The microcomputer 120 will receive a "get" signal from the microcomputer 104 each time 32 data points are converted by the A/D converter and stored in the memory 106. However, the control arrangement will not get to step 304 until 128 sets of data points are initially received and stored. If the determination in step 304 is negative, the control process loops back upon itself. If the determination in step 304 is affirmative, the process proceeds to step 306 where 128 data sets are shifted out of the memory 106 into the transformer 110. In step 307, the data transform is conducted so as to change the time domain signal into a frequency domain signal. After the transform is completed, the transformer outputs a "transform complete" signal to the microcomputer 120.

The effect of steps 303 and 304 is that the second microcomputer does not do any transforms in step 307 until 128 data points are available (step 303). After 128 data points are available, a transform is performed every time 32 new data points become available.

In step 308, a determination is made as to whether the microcomputer 120 has received the transform complete signal from the transformer 110. If the determination is negative, the control loops back to step 307. If the determination in step 308 is affirmative, the process proceeds to step 310 where the transformed data is stored in the transform memory 124. As shown in step 311, the transformed data is stored in the group of 128 data sets designated by the value of the counter.

In step 312, all of the data sets in each group of 128 data sets of the memory 124 having an amplitude greater than zero dB are added together. The data sets having an amplitude equal to or less than zero dB are not added because these amplitudes are relatively insignificant in amount. When a data set has an amplitude less than zero dB, the microcomputer 120 assumes that the amplitude is zero dB and does not add the amplitude of this data set to those data sets having an amplitude greater than zero dB. By not having to add any data sets having amplitudes equal to or less than zero dB, the processing time required of the microcomputer 120 is reduced. If none of the data sets have an amplitude equal to or less than zero dB, the microcomputer 120 takes all 128 data sets of the particular group and adds all of them together. However, for example, if twenty of the 128 data sets have amplitudes equal to or less than zero dB, the microcomputer 120 adds only the amplitudes of the other 108 data sets together.

In step 313, the resulting sum of each of the four groups of 128 data sets is saved in an internal memory register of the microcomputer 120. The resulting sum of each of the four groups of 128 data sets of the memory 124 corresponds to the integral of the amplitudes of all the frequency bins over the entire frequency spectrum of the associated Fourier transform of that particular group of 128 data sets of the memory 124. In step 314, the resulting sums of the four groups of 128 data sets of the memory 124 are totalled to provide a resulting total value.

A determination is then made in step 316 as to whether a output signal from the accelerometer assembly 22 indicative of at least 2G's of force has been detected. This determination is made by the microcomputer 104 by monitoring the output of the A/D converter 102 to determine if a threshold value has been exceeded. If the determination in step 316 is negative, the control process proceeds to step 322 to increment the value of the counter. If the determination is affirmative, the control process proceeds to step 318 in which at least one resulting total value of the integrals of the four groups of 128 data sets of the memory 124 is compared with an associated predetermined threshold value.

In step 320, the microcomputer 120 makes a determination, based upon the comparison performed in step 318, as to whether the vehicle is in a predetermined type of crash condition, e.g., one which it is desirable to actuate the passenger restraint system. A predetermined type of crash condition in which it is desirable to actuate the passenger restraint system is referred to as a deployment crash condition. If the determination in step 320 is negative, the control process proceeds to step 322 to increment the value of the counter. A determination is made in step 324 as to whether the value of the counter is equal to 5. If the determination in step 324 is negative, the control procedure loops back to step 303. If the determination in step 324 is affirmative, the control procedure goes to step 326 and resets the counter to a value of one before looping back to step 303. If the determination in step 320 is affirmative, the microcomputer 120 outputs the actuation signal to the oneshot 140 in step 328 which, in turn, initiates actuation of the passenger restraint system. It should be appreciated that steps 318 and 320 are performed only if 2G's of force are detected as determined in step 316.

Figure 20:
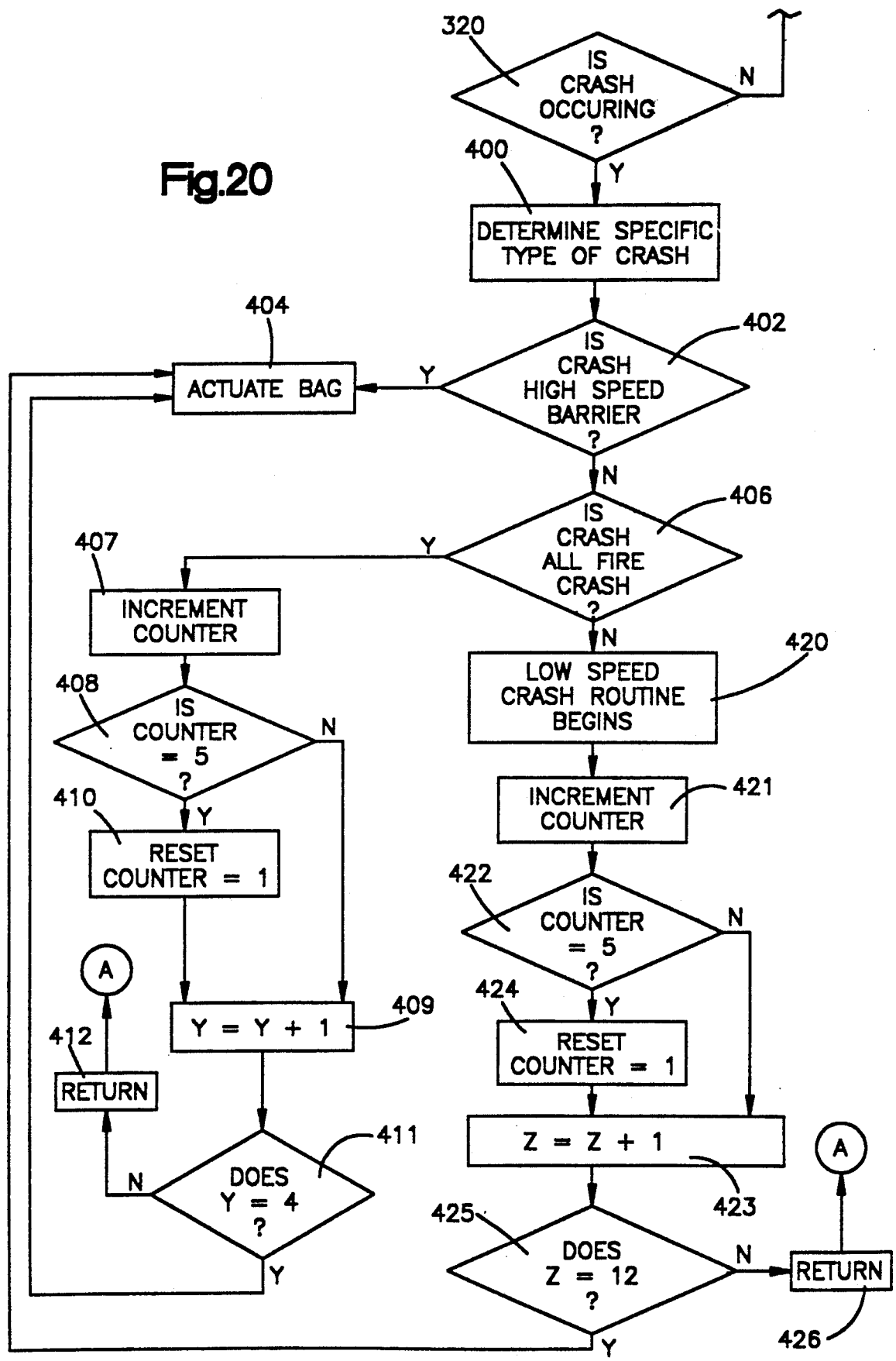
FIG. 20 is a partial flow chart depicting an alternative control process for the other microcomputer shown in FIG. 1.

FIG. 20 depicts an alternative control arrangement followed by the microcomputer 120 in accordance with another embodiment of the present invention. All control steps up to step 320 are as described with regard to FIG. 19. In step 320, a determination is made as to whether a crash is occurring for which it is desirable to actuate the airbag, i.e., a deployment crash condition. The determination in step 320 will be affirmative if the crash is greater than a no-fire barrier condition, e.g., greater than an eight miles per hour barrier crash. This determination is made by the microcomputer 120 in response to the sums of four associated integrals at preselected times and empirically determined threshold values for known crashes. If the determination in step 320 is affirmative, the microcomputer 120, based upon the sums of four associated integrals of at least one associated preselected times, determines the specific type of vehicle crash in step 400.

To make determinations of the specific type of vehicle crash based upon the sums of four associated integrals at associated preselected times, one must use an empirical technique to determine the expected values of the integrals for the different types of crashes. For example, a particular type of vehicle of concern must be subjected to several types of vehicle crashes. For each type of vehicle crash, the sums of associated integrals over time must be recorded and stored in memory in the microcomputer 120. The empirically-obtained sums of four associated integrals over time recorded and stored in memory in the microcomputer 120 are referred to herein as predetermined summation threshold values. To make the determination of the type of crash in real time, the microcomputer 120 compares the sum of four associated integrals of at least one preselected time against predetermined summation threshold values associated with that preselected time.

For the determination of the type of vehicle crash, the microcomputer 120, in step 402, determines if the crash is a high speed barrier crash. To make the determination of a high speed barrier crash, the microcomputer 120 compares the sum of four associated integrals of the at least one preselected time against the predetermined summation threshold values stored in its memory for the preselected time being considered that is indicative of a high speed barrier crash from its memory. If the determination in step 402 is affirmative, the airbag is immediately actuated in step 404.

If the determination in step 402 is negative, the microcomputer 120 makes a determination in step 406 a to whether the sum of four associated integrals of the at least one preselected time is indicative of an all fire crash condition, e.g., a low speed barrier crash greater than 8 mph, a high speed pole crash, a high speed angle crash, or a high speed car-to-car crash. If the determination in step 406 is affirmative, the value of the counter is incremented in step 407. In step 408, a determination is made as to whether the counter has a value of five. If the determination in step 408 is negative, the control process proceeds to step 409. If the determination is affirmative, the control process proceeds to step 410 to reset the counter to a value of one before proceeding to step 409. In step 409, the value of Y, which is initially set to zero, is updated to equal Y + 1. In step 411, a determination is made as to whether Y is equal to 4. This occurs after four passes through step 409. If the determination in step 411 is negative, the control procedure is returned in step 412 to step 304 of FIG. 19 through line A. If the determination in step 411 is affirmative, the microcomputer 120 outputs the trigger signal to trip the one-shot in step 404.

It will be appreciated that the steps 409 and 411 provide a time delay of four system cycles. This time delay is desirable since the type crash, i.e., one other than a high speed barrier crash does not require immediate actuation of the airbag. Also, during the time delay of four systems cycles, the sum of four associated integrals of the at least one preselected time is continuously monitored. If the type of vehicle crash does not change, the determination in step 411 will be affirmative after the fourth system cycle. If the type of crash changes during the process of continuously monitoring the sum of four associated integrals of the at least one preselected time, the control of the actuation will also change. For example, if the control arrangement were to change from an all fire crash condition as sensed in step 406 to a high speed barrier crash as determined in step 402, the determination in step 402 would change to an affirmative which would result in immediate actuation of the airbag. Also, if an all fire crash condition as sensed in step 406 were to discontinue, as may occur if a small pole were hit and were to break free from the ground, the determination in step 320 would change from affirmative to negative thereby preventing the airbag from needlessly being actuated.

If the determination in step 406 is negative, it is assumed that the type of vehicle crash is a low speed crash, indicated by block 420, of such magnitude that it is desirable to energize the airbag at a predetermined time delay after the crash is first sensed. Such low speed crashes are, for example, low speed pole crashes or low speed angle crashes. In step 421, the value of the counter is incremented. A determination is made in step 422 as to whether the counter has a value equal to five. If the determination is negative, the control process proceeds to step 423. If the determination is affirmative, the control process proceeds to step 424 to reset the counter to a value of one before proceeding to step 423.

If the determination in step 406 is negative, a value Z is initially set equal to zero. In step 423, the value of Z is updated to equal Z + 1. In step 425, a determination is made as to whether Z equals 12. This occurs when step 423 is passed through twelve times. Step 425 provides that twelve system cycles would be required with the crash condition to remaining in the low speed crash condition before the determination in step 425 would be affirmative. This time delay is desirable since it is not necessary to actuate the airbag immediately to protect the vehicle passenger. During the 12 system cycles, data processing continues. If the type of vehicle crash were to change within the time necessary to process 12 system cycles, the control of the process would also change accordingly. If the determination in step 425 is affirmative, meaning that the low speed crash condition had lasted for 12 system cycles, the airbag would then be actuated. If the determination in step 425 is negative, the control process returns in step 426 to step 304 of FIG. 19. Also, if the low speed crash condition were to discontinue, the determination in step 320 would change from affirmative to negative thereby preventing the airbag from needlessly being actuated.

This invention has been described with reference to preferred embodiments. Modifications and alterations may occur to others upon reading and understanding this specification. For example, the preferred embodiment has been described with regard to actuation of an airbag restraint system. The method and apparatus of the present invention is just as applicable to other passenger restraint systems. For example, the actuation signal can be used to lock a seat belt in a lockable seat belt system or to actuate a pretensioner for a seat belt retractor in a seat belt system. It is our intention to include all such modifications and alterations insofar as they com within the scope of the appended claims and the equivalents thereof.

Having fully described our invention, we claim:

1. An apparatus for controlling actuation of a passenger restraint system in a vehicle, said apparatus comprising:
   sensing means for providing a time domain vibratory electric signal having frequency components indicative of a vehicle crash condition;
   means for transforming the time domain vibratory electric signal over at least two time intervals into associated frequency domain signals;
   means for integrating each of the frequency domain signals;
   means for summing the integrals of the frequency domain signals; and
   means for actuating the passenger restraint system when the sum of the integrals of the frequency domain signals indicates a predetermined type of vehicle crash is occurring.

2. The apparatus of claim 1 wherein the means for transforming the time domain vibratory electric signal includes means for converting said vibratory electric signal into a digital signal and a digital transform processor connected to the means for converting.

3. The apparatus of claim 2 wherein said means for converting is an analog to digital converter and wherein said digital transform processor is a fast Fourier transformer.

4. The apparatus of claim 3 wherein said fast Fourier transformer provides 128 transform values over a predetermined frequency spectrum and wherein said at least two time intervals overlap by seventy-five percent.

5. The apparatus of claim 1 wherein said passenger restraint system includes an airbag.

6. The apparatus of claim 1 wherein said means for transforming the time domain vibratory electric signal into a frequency domain signal includes means for delaying subsequent transformations by a predetermined time delay and wherein said means for summing sums the integral of a present frequency domain signal with the integral of the time delayed frequency domain signal and provides a summation signal indicative thereof.

7. The apparatus of claim 2 further including memory means for storing a predetermined frequency domain amplitude signal indicative of a predetermined crash condition at a predetermined time and further including means for comparing the sum of the integrals of the frequency domain signals against the stored predetermined frequency domain amplitude signal, said means for actuating said passenger restraint system when the sum of the integrals of the frequency domain signals is greater than the stored predetermined frequency domain amplitude signal.

8. The apparatus of claim 1 wherein the at least two time intervals are the same length and partially overlap.

9. The apparatus of claim 1 wherein said means for integrating includes means for summing the amplitudes of the frequency components of the associated frequency domain signal over a predetermined frequency spectrum.

10. The apparatus of claim 9 wherein said means for summing the amplitudes of the frequency components of the associated frequency domain signal over the frequency spectrum sums only those frequency components having an amplitude greater than a predetermined amplitude value.

11. The apparatus of claim 10 wherein said predetermined amplitude value is zero dB.

12. The apparatus of claim 1 wherein said sensing means is a mass suspended by cantilever members from a frame secured to the vehicle so that said mass vibrates when the vehicle is subjected to a crash condition.

13. The apparatus of claim 1 wherein said means for actuating further includes means for determining which of a plurality of types of vehicle crash conditions is occurring from the sum of the integrals of the frequency domain signals and means for delaying actuation in accordance with the determined type of vehicle crash.

14. A method for controlling actuation of a passenger restraint system in a vehicle, said method comprising the steps of:
   providing a time domain vibratory electric signal having frequency components indicative of a vehicle crash condition;
   transforming the time domain vibratory electric signal over at least two time intervals into associated frequency domain signals;
   integrating each of the frequency domain signals;
   summing the integrals of the frequency domain signals; and
   actuating the passenger restraint system when the sum of the integrals of the frequency domain signals indicates a predetermined type of vehicle crash is occurring.

15. The method of claim 14 wherein the step of transforming the time domain vibratory electric signal is provided by a digital transform processor and includes the step of converting said vibratory electric signal into a digital signal.

16. The method of claim 14 wherein the step of converting includes converting an analog signal into a digital signal and wherein the step of transforming includes performing a Fourier transform.

17. The method of claim 16 wherein the step of transforming includes providing 128 transform values and wherein said at least two time intervals are overlapped by seventy-five percent.

18. The method of claim 14 wherein the step of actuating the passenger restraint system includes the step of actuating an airbag.

19. The method of claim 14 wherein the step of transforming the time domain vibratory electric signal into a frequency domain signal includes the step of delaying subsequent transformations by a predetermined time delay and wherein the step of summing includes summing the integral of a present frequency domain signal with the integral of the time delayed frequency domain signal and providing a summation signal indicative thereof.

20. The method of claim 15 further including the step of storing a predetermined frequency domain amplitude signal indicative of a predetermined crash condition at a predetermined time and further including the step of comparing the sum of the integrals of the frequency domain signals against the stored predetermined frequency domain amplitude signal and wherein the step of actuating actuates the passenger restraint system when the sum of the integrals of the frequency domain signals is greater than the stored predetermined frequency domain amplitude signal.

21. The method of claim 14 further including the step of overlapping the at least two time intervals.

22. The method of claim 14 wherein the step of integrating includes the step of summing the amplitudes of the frequency components of the associated frequency domain signal over a frequency spectrum.

23. The method of claim 22 wherein the step of summing the amplitudes of the frequency components of the associated frequency domain signal over the entire frequency spectrum includes the set of summing only those frequency components having an amplitude greater than a predetermined amplitude value.

24. The method of claim 23 wherein the step of summing only sums those frequency components having an amplitude value greater than zero dB.

25. The method of claim 14 wherein the step of actuating the passenger restraint system further includes the step of determining which of a plurality of types of vehicle crash is occurring and the step of delaying actuation in accordance with the determined type of vehicle crash.

* * * * *

UNITED STATES PATENT AND TRADEMARK OFFICE
CERTIFICATE OF CORRECTION

PATENT NO. : 5,036,467

DATED : July 30, 1991

INVENTOR(S) : Brian K. Blackburn, et al.

It is certified that error appears in the above-identified patent and that said Letters Patent is hereby corrected as shown below:

Column 18, Line 6, Claim 23, change "set" to --step--.

Signed and Sealed this

Tenth Day of November, 1992

Attest:

DOUGLAS B. COMER

Attesting Officer

Acting Commissioner of Patents and Trademarks